(12) United States Patent
Fuglsang et al.

(10) Patent No.: US 11,220,079 B2
(45) Date of Patent: Jan. 11, 2022

(54) SYSTEM AND METHOD FOR MANUFACTURING A WIND TURBINE BLADE

(71) Applicant: LM WIND POWER US TECHNOLOGY APS, Kolding (DK)

(72) Inventors: Lars Fuglsang, Odense S (DK); Torben Krogsdal Jacobsen, Lunderskov (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 75 days.

(21) Appl. No.: 16/465,355

(22) PCT Filed: Dec. 1, 2017

(86) PCT No.: PCT/EP2017/081222
§ 371 (c)(1),
(2) Date: May 30, 2019

(87) PCT Pub. No.: WO2018/100177
PCT Pub. Date: Jun. 7, 2018

(65) Prior Publication Data
US 2019/0389165 A1    Dec. 26, 2019

(30) Foreign Application Priority Data

Dec. 2, 2016   (EP) .................................. 16201924

(51) Int. Cl.
*B29D 99/00*    (2010.01)
*B29C 70/48*    (2006.01)

(52) U.S. Cl.
CPC .......... *B29D 99/0028* (2013.01); *B29C 70/48* (2013.01)

(58) Field of Classification Search
None
See application file for complete search history.

(56) References Cited

U.S. PATENT DOCUMENTS

| | | | | |
|---|---|---|---|---|
| 4,302,416 A | * | 11/1981 | Rudolf | B29D 35/084 264/244 |
| 5,094,607 A | * | 3/1992 | Masters | B29C 33/38 114/347 |
| 2011/0316182 A1 | * | 12/2011 | Mortensen | B29C 70/443 264/101 |
| 2012/0090769 A1 | * | 4/2012 | Borsting | F03D 1/065 156/166 |

FOREIGN PATENT DOCUMENTS

EP     2226186 A1     9/2010

* cited by examiner

*Primary Examiner* — Mark A Osele
*Assistant Examiner* — Evan T Hulting
(74) *Attorney, Agent, or Firm* — Nath, Goldberg & Meyer; Jerald L. Meyer; Tanya E. Harkins

(57) ABSTRACT

The present invention relates to a method of manufacturing a plurality of wind turbine blades. The method includes providing first, second and third stationary moulds, moulding respective first upper and lower shell halves, removing and turning the first upper shell half, and positioning and bonding it on the first lower shell half to form a closed wind turbine blade shell. This is repeated for continuously manufacturing a plurality of wind turbine blades.

Figure 1:
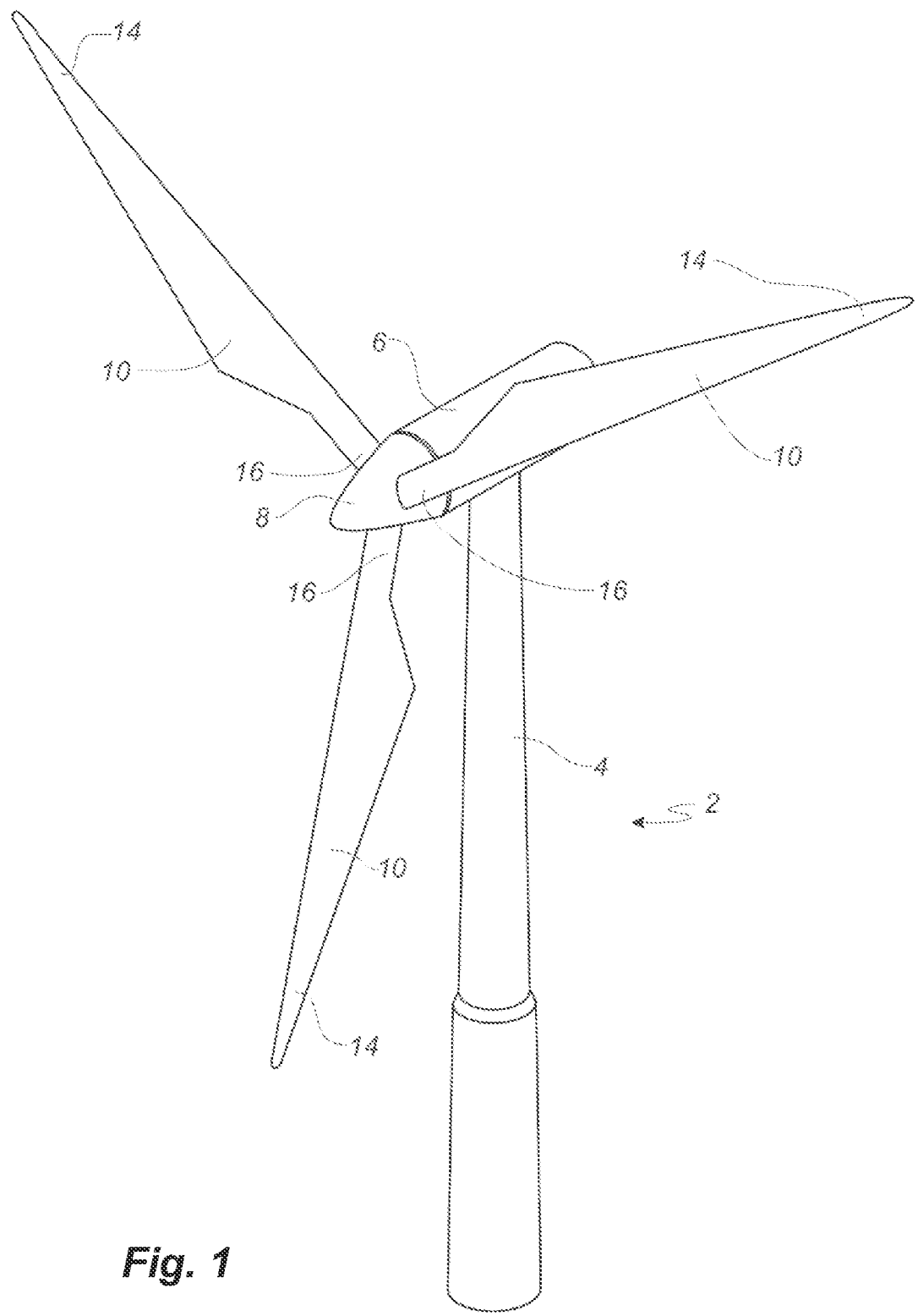

15 Claims, 4 Drawing Sheets ically made from a fibre-reinforced polymer material and
SYSTEM AND METHOD FOR MANUFACTURING A WIND TURBINE BLADE This is a National Phase Application filed under 35 U.S.C. 371 as a national stage of PCT/EP2017/081222, filed Dec. 1, 2017, an application claiming the benefit of European Application No. 16201924.4, filed Dec. 2, 2016, the content of each of which is hereby incorporated by reference in its entirety.

FIELD OF THE INVENTION

The present invention relates to a method of manufacturing a plurality of wind turbine blades, to a manufacturing system for said method and to a wind turbine blade obtainable by said method.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using moulds. First, a blade gel coat or primer is typically applied to the mould. Subsequently, fibre reinforcement and/or fabrics are placed into the mould followed by resin infusion. A vacuum is typically used to draw epoxy resin material into a mould. Alternatively, prepreg technology can be used, in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade.

In vacuum assisted resin transfer moulding (VARTM), glass fibre plies are placed in a mould with the correct orientation and subsequently resin is forced to flow through the fibres using a vacuum pump. This is usually followed by a curing cycle at atmospheric pressure.

A typical moulding process includes bagging, resin infusion and subsequent curing.

Bagging involves placing a vacuum foil on the fibre plies that have been laid up on the tool. The vacuum foil is used to press this part to the tool and to allow a vacuum to be drawn into the void formed by the bag and the tool such that the fibres of the part are infused with resin. Typical vacuum foils may be formed by one or more plastic sheets which are placed to cover the blade. Infusion comprises feeding resin under a vacuum to wet the laid out fibres to form a solid shell part. In subsequent curing, heating and subsequently cooling may be applied to harden the resin.

International patent application WO 2013/113815 A1 relates to a manufacturing method for a wind turbine blade wherein a blade shell is initially moulded in a blade mould and subsequently transferred to a post-moulding station. Closing of a first and second blade half is performed at the post-moulding station which comprises an adjustable structure.

On the background of such prior art approaches it is a first object of the present invention to provide a method for moulding a shell part of a wind turbine blade which results in reduced cost and increased productivity of the manufacturing process.

It is another object of the present invention to provide a method for moulding a shell part of a wind turbine blade that is simple and applicable to a wide range of wind turbine blade types.

SUMMARY OF THE INVENTION

In a first aspect, the present invention relates to a method of manufacturing a plurality of wind turbine blades, the method comprising the steps of:
a) providing a first stationary mould for moulding a lower shell half, providing a second stationary mould for moulding a lower shell half, and providing a third stationary mould for moulding an upper shell half,
b) moulding a first lower shell half in the first stationary mould,
c) moulding a first upper shell half in the third stationary mould,
d) removing the first upper shell half from the third stationary mould,
e) turning the first upper shell half relative to the first lower shell half and positioning the first upper shell half on the first lower shell half in the first stationary mould to form a closed wind turbine blade shell,
f) bonding the first upper and lower shell halves to form a first wind turbine blade and subsequently removing the first wind turbine blade from the first stationary mould,
g) moulding a second lower shell half in the second stationary mould before or during steps e) and/or f),
h) moulding a second upper shell half in the third stationary mould during steps e) and/or f),
i) removing the second upper shell half from the third stationary mould,
j) turning the second upper shell half relative to the second lower shell half and positioning the second upper shell half on the second lower shell half in the second stationary mould to form a closed wind turbine blade shell, and
k) bonding the second upper and lower shell halves to form a second wind turbine blade and subsequently removing the second wind turbine blade from the second stationary mould.

The present inventors have found that this method results in a considerable reduction of production costs as compared to prior art methods. Also, since the blade moulds do not have to be linked via a hinged turning mechanism, as in some prior art systems, space requirements are significantly lower, which makes the method flexible, simple and cost effective. Since the stationary moulds can be easily sourced and replaced, the present method is widely applicable to different blade types.

As used herein, the term "upper shell half" relates to the suction side shell half, whereas the term "lower shell half" relates to the pressure side shell half of a wind turbine blade. Preferably, the pressure side or suction side shell halves extend between a leading edge end and a trailing edge end to be located at respective leading and trailing edges of a finished wind turbine blade.

The stationary moulds of the present invention are substantially fixed moulds, such as moulds having substantially rigid foundations, such as concrete foundations. Providing the blade moulds as stationary moulds has the advantage of a relatively easily mould production, thus reducing expenses in this regard.

The moulding steps typically involve laying up a fibre-based material in the mould to form an uncured wind turbine blade shell half. The lay-up may be a manual or hand lay-up operation, or an automatic lay-up operation, e.g. spray lay-up, tape lay-up, fibre pultrusion, or automotive lay-up of plies. Typically, this is followed by a curing step which involves infusing said uncured shell half with a resin to cure the shell half. This infusion step may be an automatic or a manual process.

The moulded shell half has typically been substantially cured by the curing operation, preferably to a level where the blade shells can be handled without undergoing significant deformation of the shell structure. The duration of the curing operation performed will depend on the type of curing resin used in the manufacture of the blade shells, but may be on the order of 2-3 hours using standard resins. However, it will be understood that the blade shells may continue to undergo a curing process within the body of the blade shells for several hours after the denoted curing operation.

It will be understood that said curing steps comprises curing said shell half to a level wherein the shell half may be removed from a blade mould without deformation. It will further be understood that subsequent curing of the shell half may occur or the shell half may undergo a second curing operation after demoulding from the blade mould, e.g. in a dedicated curing oven.

The bonding step may involve applying an adhesive at a leading edge and a trailing edge of at least one of said shell halves, wherein said step of bonding may comprise arranging said shell halves to adhere the leading edge of the lower shell half to the leading edge of the upper shell half, and to adhere the trailing edge of the lower shell half to the trailing edge of the upper shell half. It will be understood that the invention is not limited to a direct connection between the respective leading and trailing edges of the shell halves, e.g. a tail piece or insert may be positioned between the leading edges and/or trailing edges of the shell halves.

The bonding step may further comprise the step of performing at least one intra-bonding operation on at least one of said shell halves. Preferably, said at least one intra-bonding operation is selected from one or more of the following: a blade shell repair operation, a surface grinding operation, a coating operation, a blade root flange finishing operation.

Preferably, the method comprises repeating steps b) to k) for continuously manufacturing a plurality of wind turbine blades. Thus, during every positioning and/or bonding step in either of the first or second stationary moulds, the respective other mould for the lower shell half as well as the third stationary mould can be used for moulding the next lower and upper shell halves. It is thus preferred that in the second and each subsequent cycle, step b) is carried out before or during steps j) and/or k) of the previous cycle. Likewise, it is preferred that in the second and each subsequent cycle, step c) is carried out during steps j) and/or k) of the previous cycle.

In one embodiment, steps d) and/or i) comprise lifting the upper shell half from the third stationary mould to an elevated position. This may be done by a crane or similar lifting device.

In a preferred embodiment, a lifting beam is attached to the upper shell half prior to said lifting. The lifting beam may have an attachment point or lug arranged on its top side for connecting to a crane or other lifting device. Typically, the lifting beam is attached to the upper shell half on the underside of the beam.

Preferably, the lifting step is carried out by at least one crane device. In one embodiment, steps e) and/or j) comprise turning the upper shell half relative to the lower shell half in said elevated position, preferably using the crane device.

According to one embodiment of the present invention, the positioning operation of steps e) and/or j) comprises aligning the upper shell half with the lower shell half such that a leading edge and a trailing edge of the upper shell half are in register with a respective leading edge and a respective trailing edge of the lower shell half.

In a preferred embodiment, the third stationary mould comprises a flange portion comprising one or more through holes, wherein steps c) and/or h) involve arranging fibre material and/or resin over at least part of said flange portion, wherein steps c) and/or h) further involve drilling one or more bores into said fibre material and/or resin from underneath said flange portion using the through holes as drilling guide. Preferably, the third stationary mould comprises a flange portion on each side of the mould, each flange portion comprising one or more through holes, such as two or more, or three or more through holes.

Advantageously, the first and/or second stationary mould comprises a flange portion comprising one or more pins projecting upwardly from the flange portion, and wherein the positioning operation of steps e) and/or j) involves engaging said one or more pins within the respective bores. Preferably, the first and/or second stationary mould comprises a flange portion on each side of the mould, each flange portion comprising one or more pins, such as two or more, or three or more pins.

Typically, the method further comprises the step of performing at least one post-bonding operation on at least one of said blades subsequent to said bonding operations. Said post-bonding operation may be selected from one or more of the following: a leading edge grinding operation, wherein the leading edge surface of the bonded wind turbine blade is ground to a smooth surface; a trailing edge grinding operation, wherein the trailing edge surface of the bonded wind turbine blade is ground to a smooth surface; a blade repair operation, wherein a defect in the blade surface may be corrected, e.g. by applying a filler material; a coating operation, wherein at least one layer of gel coat or erosion resistant material or tape is applied to the external surface of the bonded wind turbine blade.

In another embodiment, the bonding operation of steps f) and/or k) involves clamping the upper shell half to the lower shell half. This could be done by using moveable vacuum clamps to secure the shell halves.

In another aspect, the present invention relates to a manufacturing system for the manufacture of wind turbine blades according to the method of the present invention, the system comprising:

a first stationary mould for moulding a lower shell half,
    a second stationary mould for moulding a lower shell half,
    a third stationary mould for moulding an upper shell half,
    lifting means for removing an upper shell half from the third stationary mould,
    turning means for turning an upper shell half relative to a lower shell half, positioning means for positioning an upper shell half on a lower shell half in the first or second stationary mould to form a closed wind turbine blade shell.

Preferably, the lifting means, the turning means and/or the positioning means comprise at least one crane device. Preferably, said crane device constitutes each of said lifting means, turning means and positioning means. Said manufacturing system preferably also comprises one or more lifting beams that are attachable to the upper shell half prior to its lifting. The lifting beam may have an attachment point or lug arranged on its top side for connecting to a crane or other lifting device. Typically, the lifting beam is attached to the upper shell half on the underside of the beam.

In a preferred embodiment, the third stationary mould comprises a flange portion comprising one or more through holes. It is also preferred that the first and/or second stationary mould comprises a flange portion comprising one or more pins projecting upwardly from the flange portion for being able to carry out the above-described positioning step.

In another aspect, the present invention relates to a wind turbine blade manufactured according to the method of the present invention.

DETAILED DESCRIPTION OF THE INVENTION

Figure 2:
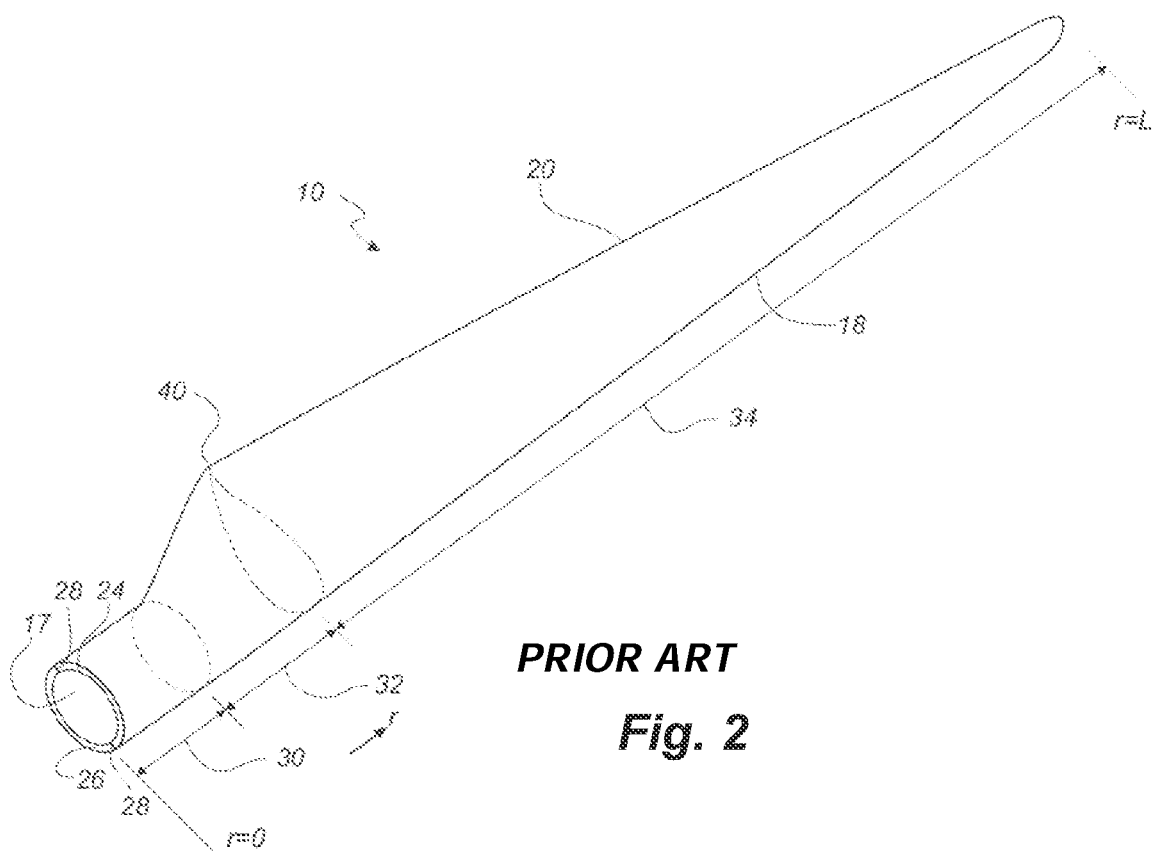
Figure 3:
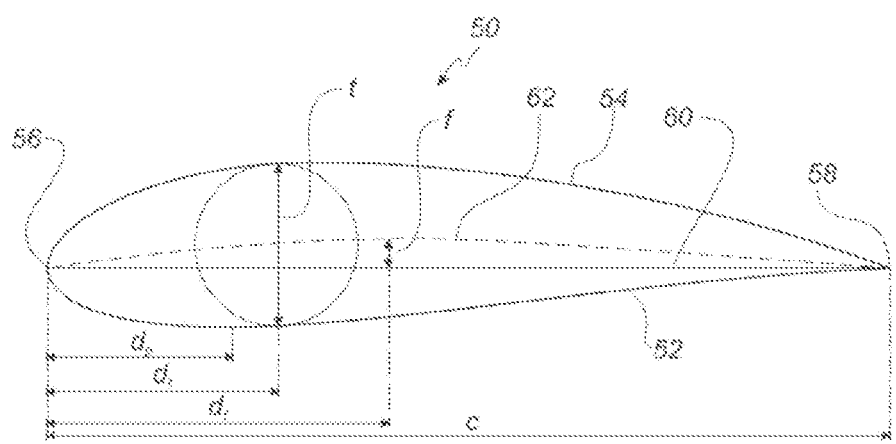
Figure 4:
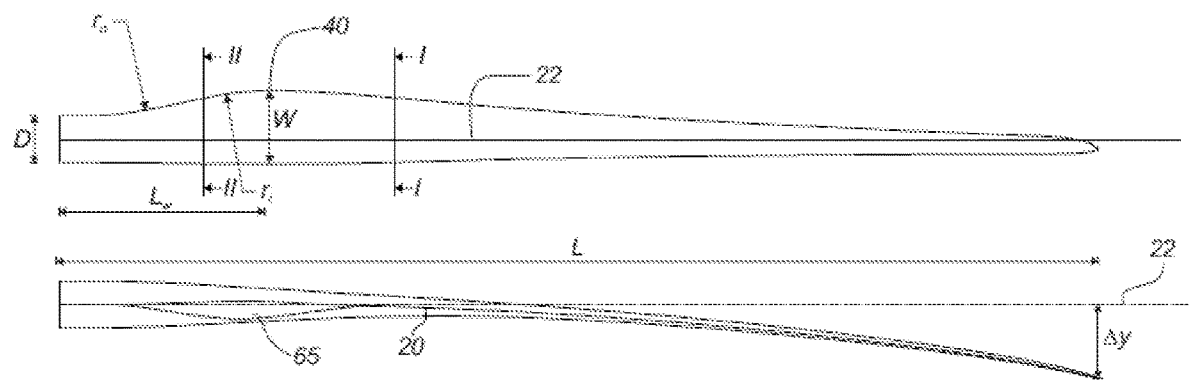
Figure 5:
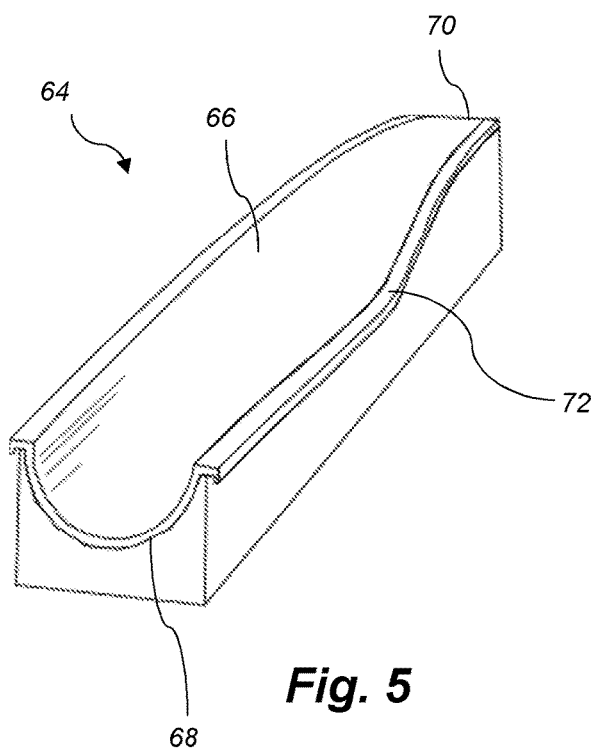
Figure 6:
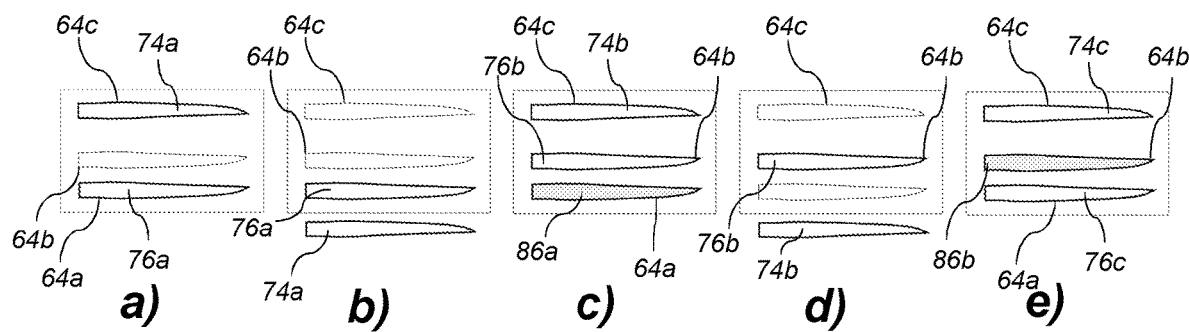
Figure 7:
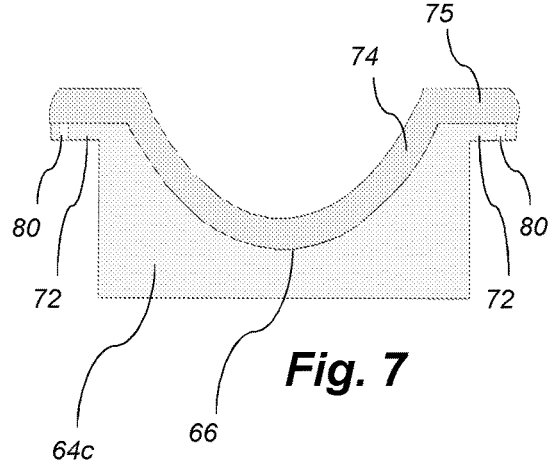
Figure 8:
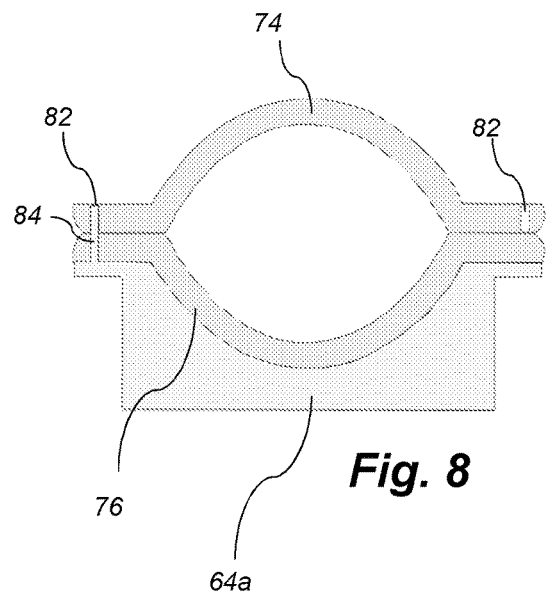

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective drawing of a mould for manufacturing a shell part of a wind turbine blade using the method of the present invention, FIG. 6 is a schematic view illustrating several steps of the manufacturing method of the present invention, FIG. 7 is a schematic cross-sectional view of a mould and shell half according to the present invention, and FIG. 8 is a schematic cross-sectional view of a mould and two shell halves according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as $\Delta y$, which corresponds to the out of plane deflection from a pitch axis 22 of the blade.

FIG. 5 illustrates a mould 64 comprising a mould surface 66 for moulding a shell part of a wind turbine blade. The mould surface has a root end 68 and an opposing tip end 70 corresponding to the respective root and tip ends of the blade to be manufactured. Fibre material is arranged in the mould surface 66 for subsequent infusion with a resin to mould the shell part, e.g. by Vacuum Assisted Resin Transfer Moulding.

FIG. 6 illustrates a method of manufacturing a plurality of wind turbine blades according to the present invention. The moulding system of the present invention comprises a first stationary mould 64a for moulding a lower shell half, a second stationary mould 64b for moulding a lower shell half, and a third stationary mould 64c for moulding an upper shell half of a wind turbine blade. At the stage shown in FIG. 6a, a first lower shell half 76a is moulded in the first stationary mould 64a, while a first upper shell half 74a is moulded in the third stationary mould 64c. The second stationary mould 64b is not used at this stage.

Subsequently, the first upper shell half 74a is removed from the third stationary mould 64c, as illustrated in FIG. 6b. The second stationary mould 64b and the third stationary mould 64c are empty at this stage.

The first upper shell half 74a is turned relative to the first lower shell half 76a and positioned on the same in the first stationary mould 64a. As shown in FIG. 6c, the shell halves 74a, 76a are bonded to form a first closed wind turbine blade shell 86a. During said positioning and/or bonding steps, a second lower shell half 76b is moulded in the second stationary mould 64b. Also, a second upper shell half 74b is moulded in the third stationary mould 64c.

In a subsequent step (FIG. 6d), the second upper shell half 74b is removed from the third stationary mould 64c. The second upper shell half 74b is then turned relative to the second lower shell half 76b and positioned on the same in the second stationary mould 64b. As shown in FIG. 6e, the shell halves 74b, 76b are bonded to form a second closed wind turbine blade shell 86b. During said positioning and/or bonding steps, a third lower shell half 76c is moulded in the first stationary mould 64a. Also, a third upper shell half 74c is moulded in the third stationary mould 64c. This loop can be repeated as applicable.

A further aspect of a manufacturing system according to the invention is illustrated in FIGS. 7 and 8. FIG. 7 illustrates a cross-sectional portion of a third stationary blade mould 64c for use in the manufacturing system. The mould 64c comprises a mould surface 66 which conforms to at least a portion of the surface of a wind turbine blade shell to be formed using the mould 64c. The mould 64c comprises a flange portion 72 for moulding a flange 75 of the upper shell half 74. A fibre material is applied to the surface 66 of the mould 64c, so that the fibre material follows the profile of the mould surface 66. The fibre material is also applied to the flange portion 72. Once sufficient fibre material has been applied to the mould 64c, a vacuum bag (not shown) is applied to the edges of the mould including the flange portion 72, such that a vacuum chamber is substantially formed between the surfaces of the mould and the vacuum bag. A resin is then injected or infused into the layers of fibre material and allowed to cure or harden, such that the fibre material forms a shell half having integrated shell flanges. It will be understood that further materials may be applied in the mould in combination with the fibre material such as structural components, e.g. foam, balsa, as well as components to aid the infusion process, e.g. infusion membranes, resin transfer media. Furthermore, the fibre material applied to the mould may comprise dry fibre layers and/or pre-preg layers. It will be understood that any suitable fibre material may be used, e.g. carbon fibres, glass fibres, etc.

The flange portion 72 comprises through holes 80 which serve as drilling guides for drilling one or more bores 82 (shown in FIG. 8) into the flange 75 of the shell half 74 from underneath said flange portion 72 of the mould 64c. This allows for correct alignment of the blade shells with different components of the manufacturing process.

The upper shell half 74 is then lifted from the mould 64c to an elevated position, preferably using a crane, turned relative to the lower shell half 76 and positioned on the latter in the first stationary mould 64a to form a closed wind turbine blade shell, as is shown in FIG. 8. The first stationary mould 64a comprises several pins 84 projecting upwardly from its flange portion (only shown on the left side of FIG. 8 for better visibility), wherein the pins 84 are engaged within the respective bores 82 in the upper shell half 74.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 mould
66 mould surface
68 root end of mould cavity
70 tip end of mould cavity
72 flange portion of mould
74 upper shell half
75 flange of upper shell half
76 lower shell half
80 through hole
82 bore
84 pin
86 closed shell c chord length
d_t position of maximum thickness
d_f position of maximum camber
d_p position of maximum pressure side camber
f camber
L blade length
r local radius, radial distance from blade root
t thickness
Δy prebend

The invention claimed is:

1. A method of manufacturing a plurality of wind turbine blades, the method comprising the steps of:
   a) providing a first stationary mould (64a) for moulding a lower shell half, providing a second stationary mould (64b) for moulding a lower shell half, and providing a third stationary mould (64c) for moulding an upper shell half, wherein each of the first, second and third stationary moulds comprises a substantially fixed mould having a substantially rigid foundation;
   b) moulding a first lower shell half in the first stationary mould (64a);
   c) moulding a first upper shell half (74a) in the third stationary mould (64c);
   d) removing the first upper shell half (74a) from the third stationary mould (64c);
   e) following step d), turning the first upper shell half (74a) relative to the first lower shell half and positioning the first upper shell half (74a) on the first lower shell half in the first stationary mould (64a) to form a closed wind turbine blade shell (86a);
   f) following step d), bonding the first upper and lower shell halves to form a first wind turbine blade and subsequently removing the first wind turbine blade from the first stationary mould (64a);
   g) moulding a second lower shell half in the second stationary mould (64b) before or during steps e) and/or f), wherein said moulding of the second lower shell half comprises applying a fibre material to a surface of the second stationary mould and injecting or infusing a resin into the fibre material;
   h) moulding a second upper shell half (74b) in the third stationary mould (64c) during steps e) and/or f), wherein said moulding of the second upper shell half comprises applying a fibre material to a surface of the third stationary mould and injecting or infusing a resin into the fibre material;
   i) removing the second upper shell half (74b) from the third stationary mould (64c);
   j) following step i), turning the second upper shell half (74b) relative to the second lower shell half and positioning the second upper shell half (74b) on the second lower shell half in the second stationary mould (64b) to form a closed wind turbine blade shell (86b); and
   k) following step i), bonding the second upper and lower shell halves to form a second wind turbine blade and subsequently removing the second wind turbine blade from the second stationary mould (64b).

2. The method according to claim 1, wherein the method comprises repeating steps b) to k) for continuously manufacturing a plurality of wind turbine blades.

3. The method according claim 1, wherein steps d) and/or i) comprise lifting the upper shell half (74) from the third stationary mould (64c) to an elevated position.

4. The method according to claim 3, wherein a lifting beam is attached to the upper shell half prior to said lifting.

5. The method according to claim 3, wherein said lifting is carried out by at least one crane device.

6. The method according to claim 3, wherein steps e) and/or j) comprise turning the upper shell half (74) relative to the lower shell half (76) in said elevated position.

7. The method according to claim 1, wherein the positioning operation of steps e) and/or j) comprises aligning the upper shell half with the lower shell half such that a leading edge and a trailing edge of the upper shell half are in register with a respective leading edge and a respective trailing edge of the lower shell half.

8. The method according to claim 1, wherein the third stationary mould (64c) comprises a flange portion (72) comprising one or more through holes (80), and wherein steps c) and/or h) involve arranging fibre material and/or resin over at least part of said flange portion, wherein steps c) and/or h) further involve drilling one or more bores (82) into said fibre material and/or resin from underneath said flange portion using the through holes as drilling guide.

9. The method according to claim 8, wherein the first and/or second stationary mould (64b) comprises a flange portion comprising one or more pins (84) projecting upwardly from the flange portion, and wherein the positioning operation of steps e) and/or j) involves engaging said one or more pins (84) within the respective bores (82).

10. The method according to claim 1, wherein the method further comprises the step of performing at least one post-bonding operation on at least one of said blades subsequent to said bonding operations.

11. The method according to claim 1, wherein the bonding operation of steps f) and/or k) involves clamping the upper shell half to the lower shell half.

12. A manufacturing system for the manufacture of wind turbine blades according to the method of claim 1, the system comprising:
    a first stationary mould (64a) for moulding a lower shell half;
    a second stationary mould (64b) for moulding a lower shell half;
    a third stationary mould (64c) for moulding an upper shell half, wherein each of the first, second and third stationary moulds comprises a substantially fixed mould having a substantially rigid foundation;
    lifting means for removing an upper shell half from the third stationary mould (64c);
    turning means for turning an upper shell half relative to a lower shell half;
    positioning means for positioning an upper shell half on a lower shell half in the first or second stationary mould (64b) to form a closed wind turbine blade shell.

13. The manufacturing system according to claim 12, wherein the lifting means, the turning means and/or the positioning means comprise at least one crane device.

14. The manufacturing system according to claim 12, wherein the third stationary mould (64c) comprises a flange portion comprising one or more through holes.

15. The wind turbine blade manufactured according to the method as claimed in claim 1.

* * * * *